United States Patent [19]

Weinberg et al.

[11] 4,116,942
[45] Sep. 26, 1978

[54] PROCESS FOR CATALYTIC PRODUCTION OF POLYESTERS

[75] Inventors: Kurt Weinberg, Upper Saddle River, N.J.; Gordon Carlton Johnson, Armonk, N.Y.

[73] Assignee: Union Carbide Corporation, New York, N.Y.

[21] Appl. No.: 772,759

[22] Filed: Feb. 28, 1977

[51] Int. Cl.$^2$ .............................................. C08G 63/12
[52] U.S. Cl. ................................ 528/283; 252/431 C; 260/446; 528/286
[58] Field of Search ................. 252/431 C; 260/75 R, 260/446

[56] References Cited

U.S. PATENT DOCUMENTS

| | | | |
|---|---|---|---|
| 2,465,319 | 3/1949 | Whinfield et al. ................. | 260/75 R |
| 3,377,319 | 4/1968 | Wiener ............................... | 260/75 R |
| 3,536,667 | 10/1970 | Stewart et al. .................... | 260/75 R |
| 3,546,179 | 11/1970 | Koller ................................ | 260/75 R |
| 3,758,535 | 9/1973 | Vizurraga ....................... | 260/75 R X |
| 3,833,630 | 9/1974 | Loeffler ............................. | 260/446 |

OTHER PUBLICATIONS

Mehrotra et al., Jour. Ind. Chem. Soc., v. 42, No. 5, pp. 327–332, (1965).

*Primary Examiner*—Helen M. S. Sneed
*Attorney, Agent, or Firm*—Francis M. Fazio

[57] ABSTRACT

A process for producing polyesters and copolyesters, useful for making films and fibers, by the polycondensation of dicarboxylic acids and aliphatic glycols using mixtures of antimony diglycollate and silicon compounds as catalysts.

12 Claims, No Drawings

PROCESS FOR CATALYTIC PRODUCTION OF POLYESTERS

BACKGROUND OF THE INVENTION

The production of polyesters and copolyesters of dicarboxylic acids and aliphatic glycols has been carried out commercially for many decades. Among the earliest disclosures relating to this technology is the disclosure in U.S. Pat. No. 2,465,319, issued Mar. 22, 1949. Since this disclosure many variations have been made in the process and many catalysts have been discovered and patented. On Dec. 8, 1970, there issued U.S. Pat. No. 3,546,179, which is directed to the use of compounds containing both the silicon and phosphorus atoms in the molecule as catalysts.

SUMMARY OF THE INVENTION

It has now been found that mixtures comprising antimony diglycollate and a silicon compound, as hereinafter defined, are excellent polyesterification catalyst complexes for the production of polyesters and copolyesters useful for making films, fibers and other shaped articles.

DESCRIPTION OF THE INVENTION

In the production of polyesters and copolyesters the reaction is generally considered a dual or two stage reaction. In the first stage esterification or transesterification occurs and in the second stage polycondensation occurs. This invention is concerned with novel polyesterification catalyst compositions and processes for producing polyesters.

The novel catalyst compositions of this invention are complexes of (A) antimony diglycollate and (B) a silicon compound, as hereinafter more fully defined. The use of our catalyst complexes or compositions results in a shorter reaction period, and the production of polyesters and copolyesters of high degrees of polycondensation that are characterized by high melting point, high elongation at break, good tensile strength, high degree of whiteness, and a good stability to heat and light.

The first stage esterification or transesterification reaction is carried out in the traditional manner by heating the mixture at from about 150° C. to about 270° C., preferably from about 175° C. to about 250° C. During this stage any of the well-known esterification or transesterification catalysts can be used; illustrative thereof one can mention zinc acetate, manganese acetate, cobaltous acetate, zinc succinate, zinc borate, magnesium methoxide, sodium methoxide, cadmium formate, and the like. The concentration thereof is that conventionally used, namely from about 0.001 to about 1 percent by weight, based on the weight of dicarboxylic acid compound charged. It is preferably from about 0.005 to about 0.5 percent by weight and more preferably from about 0.01 to about 0.2 percent by weight.

In the second stage, or the polycondensation, the novel catalyst complexes of this invention are useful. These novel catalysts comprise two essential components. The first component is antimony diglycollate and the second component is one or more of the hereinafter defined silicon compounds.

The antimony diglycollate is used at a concentration of from 0.01 to about 0.2 weight percent, or higher, based on the weight of dicarboxylic acid compound charged, preferably from 0.02 to 0.04 weight percent. Any catalytically effective concentration can be employed. As used in this application the term "dicarboxylic acid compounds" means the free dicarboxylic acids and the esters thereof.

The silicon compound is used at a concentration of from 0.01 to 0.3 weight percent, or higher, based on the weight of dicarboxylic acid compound charged, preferably from 0.06 to 0.15 weight percent; provided a catalytically effective concentration is employed.

The molar ratio of antimony diglycollate to silicon compound can vary from about 0.2:1 to about 2:1, or more, in the catalyst mixture, and it is preferably from about 0.2:1 to about 0.6:1.

The dicarboxylic acid compounds used in the production of polyesters and copolyesters are well-known to those skilled in the art and illustratively include tetephthalic acid, isoterephthalic acid, p,p'-diphenyldicarboxylic acid, p,p'-dicarboxydiphenyl ethane, p,p'-dicarboxydiphenyl hexane, p,p'-dicarboxydiphenyl ether, p,p'-dicarboxyphenoxy ethane, and the like, and the dialkyl esters thereof that contain from 1 to about 5 carbon atoms in the alkyl groups thereof.

Suitable aliphatic glycols for the production of polyesters and copolyesters are the acyclic and alicyclic aliphatic glycols having from 2 to 10 carbon atoms, especially those represented by the general formula $HO(CH_2)_pOH$ wherein $p$ is an integer having a value of from 2 to about 10, such as ethylene glycol, trimethylene glycol, tetramethylene glycol, pentamethylene glycol, decamethylene glycol, and the like. Other known suitable aliphatic glycols include 1,4-cyclohexanedimethanol, 3-ethyl-1,5-pentanediol, 1,4-xylylene glycol, 2,2,4,4-tetramethyl-1,3-cyclobutanediol, and the like. One can also have present a hydroxylcarboxyl compound such as 4-hydroxybenzoic acid, 4-hydroxyethoxybenzoic acid, or any of the other hydroxylcarboxyl compounds known as useful to those skilled in the art.

It is also known that mixtures of the above dicarboxylic acid compounds or aliphatic glycols can be used and that a minor amount of the dicarboxylic acid component, generally up to about 10 mole percent, can be replaced by other acids or modifiers such as adipic acid, succinic acid, sebacic acid, or the esters thereof, or with a modifier that imparts improved dyeability to the polymers. In addition one can also include pigments, delusterants or optical brightness by the known procedures and in the known amounts.

The polycondensation reaction is generally carried out at a temperature of from about 225° C. to about 325° C., preferably from about 250° C. to about 290° C. at reduced pressure and under an inert atmosphere. These traditional reaction conditions are well known to those skilled in the art.

The silicon compounds that are used in conjunction with antimony diglycollate as the catalyst mixture of this invention are represented by the following generic formulas:

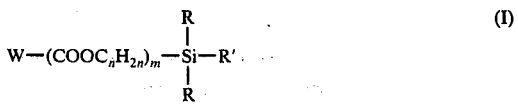

(I)

-continued

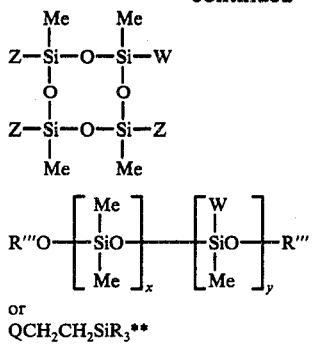

or

QCH$_2$CH$_2$SiR$_3$** (IV)

wherein
W is CH$_2$=CX— or

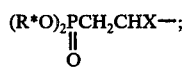

X is hydrogen or methyl and is methyl only when m is one;
R* is alkyl or haloalkyl having from 1 to 4 carbon atoms;
R** is methyl, ethyl, butyl, acetoxy, methoxy, ethoxy or butoxy;
R is methyl, ethyl, butyl, methoxy, ethoxy, butoxy, or trimethylsiloxy;
R' is methyl, methoxy, ethoxy, butoxy or trimethylsiloxy;
R" is methoxy, ethoxy, butoxy, trimethylsiloxy or vinyldimethylsiloxy;
R''' is methyl, ethyl, butyl or trimethylsilyl;
Me is methyl;
Z is methyl or W;
Q is an NH$_2$CH$_2$—, NH$_2$CH$_2$CH$_2$NHCH$_2$—, NC—, HS— or HSCH$_2$CH$_2$S— group;
n is an integer having a value of from 2 to 5;
m is an integer having a value of zero or one;
x is an integer having a value of from 1 to 100; and
y is an integer having a value of from 1 to 100.

Subgeneric to (I) are the compounds represented by the following subgeneric formulas:

(I) (A)
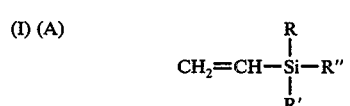

(I) (B)
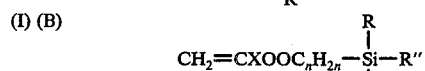

(I) (C)
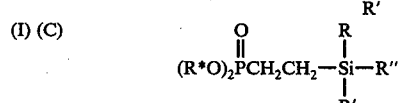

(I) (D)
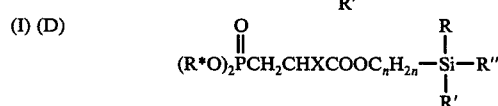

Subgeneric to (II) are the compounds represented by the following subgeneric formulas:

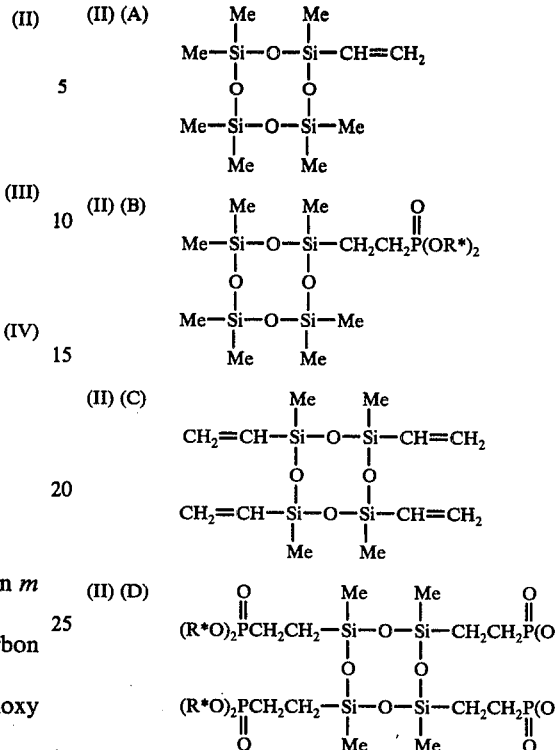

Illustrative of suitable silicon compounds one can mention the following: beta-cyanoethyl triethoxysilane, gamma-mercaptopropyl triethoxysilane, gamma-aminopropyl triethoxysilane, diethoxyphosphorylethyl methyl vinyl triethoxysilane, vinyl trimethoxysilane, vinyl triacetoxysilane, gamma-methacryloxypropyl trimethoxysilane, diethoxyphosphorylethyl heptamethyl cyclotetrasiloxane, beta-cyanoethyl trimethylsilane, N-gamma-(2-aminoethyl)aminopropyl triethoxysilane, S-beta(2-mercaptoethyl)mercaptoethyl triethoxysilane, beta-mercaptoethyl triethoxysilane, vinyl methyl diethoxysilane, vinyl methyl di(trimethylsiloxy)silane, tetramethyl divinyl disiloxane, heptamethyl vinyl cyclotetrasiloxane, 1,3,5,7-tetramethyl 1,3,5,7-tetravinyl cyclotetrasiloxane, diethoxyphosphorylethyl methyl diethoxysilane, diethoxyphosphorylisopropyl triethoxysilane, diethoxyphosphorylethyl methyl di(trimethylsiloxy)silane, heptamethyl diethoxyphosphorylethyl cyclotetrasiloxane, 1,3,5,7-tetramethyl 1,3,5,7-tetra(diethoxyphosphorylethyl)cyclotetrasiloxane, 1,1,3,3-tetramethyl-1,3-di(diethoxyphosphorylethyl)disiloxane.

In a typical reaction, the prescribed amounts of dicarboxylic acid compounds, diols, modifiers and catalysts are charged to the reactor. The reaction mixture is then heated in an inert gas atmosphere at a temperature of from 180° C. to 210° C. to effect the initial esterification or transesterification. Thereafter, any excess glycol is removed and the transesterification is completed by heating the reaction mixture at a temperature of from about 225° C. to about 235° C. The second stage polycondensation reaction is then carried out by heating the reaction mixture at a temperature of from about 225° C. to about 325° C. under a reduced pressure of from about 0.1 mm. to about 20 mm. of mercury, preferably below about 1 mm. The use of the catalyst complexes or mixtures of this invention has often resulted in shorter overall reaction periods and in many instances decreased formation of the glycol dimer during the reaction.

In this application the intrinsic viscosity values were determined by preparing a solution of 0.5 weight percent of the polyester in O-chlorophenol and measuring the viscosity at 25° C. in an Ubbelohde viscometer.

Fibers were produced from the polyester by grinding the polyester to a powder and then drying the powder under vacuum for 24 hours. The molten polyester resin was forced through a sand-bed filter at 290° C. to remove gel particles and then extruded through a spinnerette having 30 holes, each 0.02 inch in diameter. The extruded filaments were air cooled and wound at 550 feet per minute. Subsequently the tow was stretched by heating over a hot shoe at 90° C. followed by a heated pin at 95° C. The stretch ratio was 5:1.

The following examples serve to further illustrate the invention.

EXAMPLE 1

A mixture of 39.1 grams of dimethyl terephthalate, 32.4 grams of ethylene glycol, 0.0176 gram of zinc acetate dihydrate as transesterification catalyst and a mixture of 0.020 gram of antimony diglycollate and 0.053 gram of beta-diethoxyphosphorylethyl methyl diethoxysilane as polycondensation catalyst were combined and heated at 178° to 190° C. for 3 hours under argon to effect transesterification. The reaction mixture was then heated to 230° C. and this temperature was maintained for 1 hour. The temperature was thereafter raised to 280° C. while the pressure was reduced to less than 1 mm. of mercury and then maintained for 50 minutes at these temperatures and pressure conditions to carry out the polycondensation. The polycondensation was continued until the intrinsic viscosity of the polyester was 0.57.

Fibers produced from this polyester had a denier of 122, an elongation at break of 20% and a tenacity of 3.62 g/d.

For comparative purposes the same reaction was carried out under similar conditions using 736.4 grams of dimethyl terephthalate, 533.2 grams of ethylene glycol, 0.2711 gram of zinc acetate dihydrate and 0.2726 gram of antimony oxide as catalyst. The polycondensation time required was 60 minutes to achieve the same intrinsic viscosity, a period of time 20 percent longer.

Fibers produced from this polyester had a denier of 124, an elongation at break of 11.7% and a tenacity of 3.69 g/d.

Following the procedure of Example 1, polyester is produced by substitution of the following silicon compounds for the beta-diethoxyphosphorylethyl methyl diethoxysilane: 3-aminopropyl triethoxysilane, 2-cyanoethyl triethoxysilane, 2-mercaptoethyl triethoxysilane, vinyl methyl diethoxysilane, and tetramethyl divinyl disoloxane.

What we claim is:

1. In a process for the manufacture of solid fiber-forming polyesters or copolyesters of dicarboxylic acid compounds and aliphatic glycols in the presence of catalysts, the improvement which comprises using as polyesterification catalyst a mixture comprising:
   (A) antimony diglycollate and
   (B) a silicon compound selected from the group consisting of:

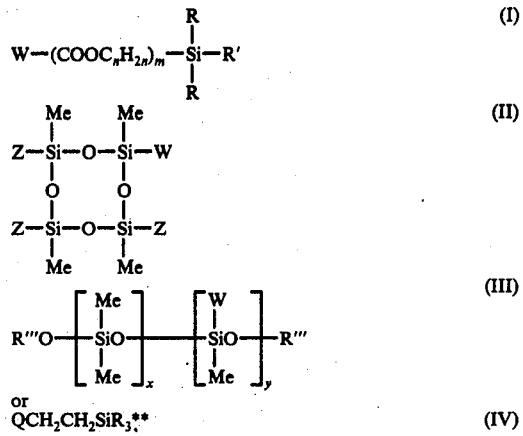

or
QCH$_2$CH$_2$SiR$_3^{**}$     (IV)

wherein
W is CH$_2$=CX— or

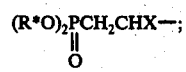

X is hydrogen or methyl and is methyl only when $m$ is one;
R* is alkyl or haloalkyl having from 1 to 4 carbon atoms;
R** is methyl, ethyl, butyl, methoxy, ethoxy or butoxy;
R is methyl, ethyl, butyl, methoxy, ethoxy, butoxy or trimethylsiloxy;
R' is methyl, methoxy, ethoxy, butoxy or trimethylsiloxy;
R" is methoxy, ethoxy, butoxy, trimethylsiloxy or vinyldimethylsiloxy;
R''' is methyl, ethyl, butyl or trimethylsilyl;
Me is methyl;
Z is methyl or W;
Q is an NH$_2$CH$_2$—, NH$_2$CH$_2$CH$_2$NHCH$_2$—, NC—, HS— or HSCH$_2$CH$_2$S— group;
$n$ is an integer having a value of from 2 to 5;
$m$ is an integer having a value of zero or one;
$x$ is an integer having a value of from 1 to 100; and
$y$ is an integer having a value of from 1 to 100.

2. A process as claimed in claim 1, wherein silicon compound (B) is a compound of the general formula:

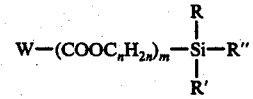

wherein W, R, R', R", $n$ and $m$ are as defined in claim 1.

3. A process as claimed in claim 1, wherein silicon compound (B) is a compound of the general formula:

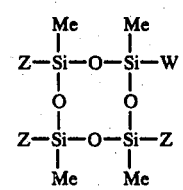

wherein Me, W and Z are as defined in claim 1.

4. A process as claimed in claim 1, wherein silicon compund (B) is a compound of the general formula:

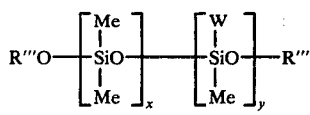

wherein Me, W, R''', x and y are as defined in claim 1.

5. A process as claimed in claim 1, wherein silicon compound (B) is a compound of the general formula:

wherein Q and R** are as defined in claim 1.

6. A process as claimed in claim 1, wherein the silicon compound (B) is beta-diethoxyphosphorylethyl methyl diethoxysilane.

7. A catalyst mixture comprising:
(A) antimony diglycollate and
(B) a silicon compound selected from the group consisting of:

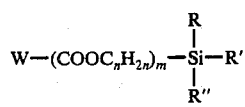 (I)

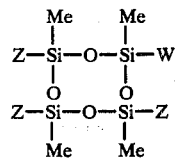 (II)

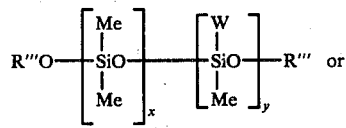 or (III)

 (IV)

wherein
W is CH$_2$=CX— or

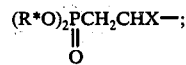

X is hydrogen or methyl and is methyl only when m is one;
R* is alkyl or haloalkyl having from 1 to 4 carbon atoms;
R** is methyl, ethyl, butyl, acetoxy, methoxy, ethoxy or butoxy;
R is methyl, ethyl, butyl, methoxy, ethoxy, butoxy or trimethylsiloxy;
R' is methyl, methoxy, ethoxy, butoxy or trimethylsiloxy;
R'' is methoxy, ethoxy, butoxy, trimethylsiloxy or vinyldimethylsiloxy;
R''' is methyl, ethyl, butyl or trimethylsilyl;
Me is methyl;
Z is methyl or W;
Q is an NH$_2$CH$_2$—, NH$_2$CH$_2$CH$_2$NHCH$_2$—, NC—, HS— or HSCH$_2$CH$_2$S— group;
n is an integer having a value of from 2 to 5;
m is an integer having a value of zero or one;
x is an integer having a value of from 1 to 100; and
y is an integer having a value of from 1 to 100.

8. A catalyst mixture as claimed in claim 7, wherein silicon compound (B) is a compound of the general formula:

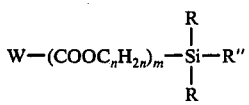

wherein W, R, R', R'', n and m are as defined in claim 1.

9. A catalyst mixture as claimed in claim 7, wherein silicon compound (B) is a compound of the general formula:

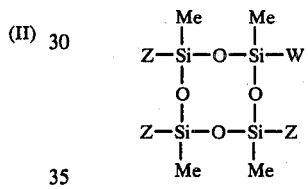

wherein Me, W and Z are as defined in claim 1.

10. A catalyst mixture as claimed in claim 7 wherein silicon compound (B) is a compound of the general formula

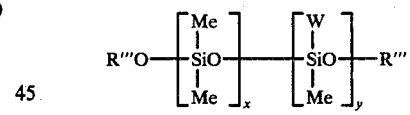

wherein Me, W, R''', x and y are as defined in claim 1.

11. A catalyst mixture as claimed in claim 7, wherein silicon compound (B) is a compound of the general formula:

wherein Q and R** are as defined in claim 1.

12. A catalyst mixture as claimed in claim 7, wherein the silicon compound is beta-diethoxyphosphorylethyl methyl diethoxysilane.

* * * * *